US009235014B2

(12) United States Patent  
Wang et al.

(10) Patent No.: US 9,235,014 B2  
(45) Date of Patent: Jan. 12, 2016

(54) OPTICS SYSTEM MODULE FOR USE IN AN OPTICAL COMMUNICATIONS MODULE, AN OPTICAL COMMUNICATIONS SYSTEM, AND A METHOD

(71) Applicant: Avago Technologies General IP (Singapore) Pte. Ltd., Singapore (SG)

(72) Inventors: Tak K. Wang, Cupertino, CA (US); Chung-Yi Su, Fremont, CA (US); Frank Yashar, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/956,039

(22) Filed: Jul. 31, 2013

(65) Prior Publication Data

US 2015/0036984 A1  Feb. 5, 2015

(51) Int. Cl.
| | |
|---|---|
| *G02B 6/36* | (2006.01) |
| *H04B 10/00* | (2013.01) |
| *H04B 10/04* | (2006.01) |
| *H04B 10/12* | (2006.01) |
| *H04B 10/06* | (2006.01) |
| *G02B 6/42* | (2006.01) |
| *G02B 6/32* | (2006.01) |

(52) U.S. Cl.
CPC ............. *G02B 6/4246* (2013.01); *G02B 6/423* (2013.01); *G02B 6/4214* (2013.01); *G02B 6/32* (2013.01); *G02B 6/424* (2013.01); *G02B 6/4204* (2013.01); *G02B 6/428* (2013.01); *G02B 6/4212* (2013.01); *G02B 6/4239* (2013.01); *G02B 6/4244* (2013.01); *G02B 6/4284* (2013.01)

(58) Field of Classification Search
CPC .... G02B 6/4214; G02B 6/4246; G02B 6/423; G02B 6/32; G02B 6/4204
USPC .......... 385/88, 89, 92–94; 398/139, 200, 201, 398/212, 214
See application file for complete search history.

(56) References Cited

U.S. PATENT DOCUMENTS

| 4,632,505 | A  | * | 12/1986 | Allsworth ........................ 385/61 |
| 4,955,976 | A  | * | 9/1990 | Freeman et al. ................. 385/55 |
| 5,175,780 | A  | * | 12/1992 | Sano et al. ...................... 385/47 |
| 6,385,374 | B2 | * | 5/2002 | Kropp .............................. 385/47 |
| 6,766,086 | B1 | * | 7/2004 | Sherman et al. ................. 385/52 |
| 6,788,872 | B2 | * | 9/2004 | Bonja ............................ 385/137 |
| 7,126,696 | B2 |   | 10/2006 | Tobiason |

(Continued)

OTHER PUBLICATIONS

Christopher Raum, Ralph Mason, Optical Fibre Alignment Using Micromachines, Journal, 1995, p. 371-376, IEEE WESCANEX 95, Winnipeg, Canada.

(Continued)

*Primary Examiner* — Robert Tavlykaev

(57) ABSTRACT

An optics system module for use in an optical communications module is provided that can be more easily aligned with the module during the mounting process, that reduces the possibility of the fiber ends being damaged when they are connected to the respective optical ports of the optics system, and that eliminates or reduces the occurrence of Fresnel losses at the interfaces between the fiber end faces and the optical ports. The optical ports have non-round shapes that are symmetrical to the shapes of the fibers in the transverse direction, i.e., in the direction that is transverse to the optical axes of the fibers. The non-round, symmetrical shape of the optical ports reduces the amount of force that the optical ports exert on the respective optical fibers.

33 Claims, 7 Drawing Sheets

(56) References Cited

U.S. PATENT DOCUMENTS

| | | |
|---|---|---|
| 8,123,417 B2 * | 2/2012 | Wertman et al. ............. 385/78 |
| 8,272,120 B2 | 9/2012 | Gruber et al. |
| 2003/0063861 A1 * | 4/2003 | Fouquet et al. ............. 385/52 |
| 2004/0179784 A1 * | 9/2004 | Vancoille et al. ............ 385/47 |
| 2006/0210225 A1 * | 9/2006 | Fujiwara et al. ............ 385/92 |
| 2009/0052836 A1 * | 2/2009 | Hodge ....................... 385/14 |
| 2010/0019339 A1 | 1/2010 | Walberg et al. |
| 2010/0284647 A1 * | 11/2010 | Stevenson ................. 385/14 |
| 2011/0013866 A1 | 1/2011 | Rosenberg et al. |
| 2011/0049334 A1 * | 3/2011 | Nasu et al. .............. 250/208.2 |
| 2012/0127565 A1 | 5/2012 | Haralur et al. |
| 2012/0257860 A1 * | 10/2012 | Li et al. ..................... 385/83 |
| 2014/0205246 A1 * | 7/2014 | Li et al. ..................... 385/83 |

OTHER PUBLICATIONS

Extem Resins, Product Guide, 2008, p. 1-40, SABIC Innovative Plastic, Pittsfield, United States.

Aditya Narayanan, Gurulingamurthy Haralur, New Melt-Processable Termoplastic Polymides for Opro-Electronic Applications, Journal, Oct. 2012, p. 1-2, SPIE, United States.

Lynx-CustomFit Splice On-Connector (SOC), Procedural Manual, 2008, p. 1-14, Sumitomo Electric Lightwave Corporation, Research Triangle Park, United States.

* cited by examiner

OPTICS SYSTEM MODULE FOR USE IN AN OPTICAL COMMUNICATIONS MODULE, AN OPTICAL COMMUNICATIONS SYSTEM, AND A METHOD

TECHNICAL FIELD OF THE INVENTION

The invention relates to optical communications modules. More particularly, the invention relates to an optics system module for use in an optical communications module, an optical communications module that incorporates the optics system module, and a method.

BACKGROUND OF THE INVENTION

A variety of optical communications modules are used in optical networks for transmitting and receiving optical data signals over the networks. An optical communications module may be (1) an optical receiver module that has optical receiving capability, but not optical transmitting capability, (2) an optical transmitter module that has optical transmitting capability, but not optical receiving capability, or (3) an optical transceiver module that has both optical transmitting and optical receiving capability.

A typical optical transmitter module has a transmitter module housing, an electrical subassembly (ESA) disposed within the housing, and an optics system module secured to the transmitter module housing or to the ESA. The ESA of the transmitter module typically includes a module printed circuit board (PCB), a laser driver circuit mounted on the module PCB, at least one laser diode mounted on the module PCB, and various other electrical components mounted on the module PCB. The laser driver circuit outputs an electrical drive signal to each respective laser diode to cause the respective laser diode to be modulated. When the laser diode is modulated, it outputs optical signals that have power levels corresponding to logic 1s and logic 0s. The optics system module performs the function of directing the optical signals produced by each respective laser diode into the end of a respective transmit optical fiber. The ends of the transmit optical fibers are mechanically and optically coupled to the optics system module by some type of securing mechanism. The module PCB is often mounted on a higher-level system PCB and electrical interconnections are made between the two PCBs.

A typical optical receiver module has a receiver module housing, an ESA disposed within the housing, and an optics system module secured to the receiver module housing or to the ESA. The ESA includes a module PCB, at least one receive photodiode mounted on the module PCB, and various other electrical components mounted on the module PCB. The optics system of the optical receiver module directs an optical data signal that is output from the end of an optical fiber onto one of the respective photodiodes. The photodiode converts the incoming optical data signal into an electrical signal. An electrical detection circuit, such as a transimpedance amplifier (TIA), receives the electrical signal produced by the photodiode and outputs a corresponding amplified electrical signal, which is processed by other circuitry of the ESA to recover the data. The module PCB is often mounted on a higher-level system PCB and electrical interconnections are made between the two PCBs.

In optical transceiver modules, the receiver and transmitter ESAs are typically consolidated into a single ESA having a single module PCB on which the laser diodes, photodiodes and other electrical components of the receiver and transmitter are mounted. All of these components are housed within a transceiver module housing. A single optics system module is typically used in the optical transceiver module for coupling optical signals between the ends of the optical fibers and the respective photodiodes and laser diodes.

During the process of assembling a transmitter, receiver or transceiver module of the type described above, surface mount components of the ESA are first mounted on the module PCB with a standard surface mount technology (SMT) process. Typical surface mount components include resistors, capacitors, inductors, and clock and data recovery (CDR) circuitry. The ESA is then cleaned. After the SMT process has been performed and the ESA has been cleaned, a die attach process is performed to attach the laser diode driver circuit, the laser diode, the TIA, and the photodiode to the module PCB. During the die attach process, a machine vision system captures images of the components and of the PCB. Based on these images, the robotics system makes adjustments to the positions and orientations of the components to bring them into their proper positions and orientations on the PCB.

After the die attach process has been performed, wire bonding processes are performed to make all of the necessary electrical connections. After the die attach process has been performed, the ESA cannot be subjected to any additional solder reflow processes because solder reflow processes typically leave behind residue or debris such as solder flux and solder balls on the PCB and/or on the other components of the ESA. If not removed, the residue can result in performance problems. For example, solder flux can come into contact with bond wires resulting in electrical performance problems, or it can interfere with the optical pathways resulting in optical performance problems. Cleaning also is not possible at this stage because it can damage the wire bonds. In addition, it is difficult to wash out flux and debris in the tightly-spaced optical pathways. For these reasons, the optical communications module typically is not soldered to the system PCB, but rather, is typically configured to mechanically couple with a non-solder interface, such as a mechanical connector that is soldered to the system PCB. This non-solder interface adds to the cost of the system.

After the die attach and wire bonding processes have been performed, the optics system module is mounted onto the ESA. The optics system module is typically a molded plastic part having one or more optical coupling elements formed therein for coupling optical signals between the ends of the optical fibers and the respective optoelectronic components (i.e., the laser diodes and photodiodes). The optical coupling elements are typically refractive, diffractive or reflective optical elements (e.g., lenses, reflectors, diffractive gratings). The ends of the optical fibers are mechanically coupled to the optics system module via a direct coupling arrangement (e.g., butt coupling) or via an optical connector device that holds the ends of the optical fibers and mates with the module housing.

During the process of mounting the optics system module on the ESA, a precision pick and place system with a camera and a computer running pattern recognition software is used to recognize the positions of the optoelectronic component and the optics system module. After a few modules are made, they are often taken off line for measurement of alignment accuracy with a microscope system. Adjustments are made to the pick and place system according to the microscope measurement to ensure that the optical elements of the optics system module are in accurate alignment with the respective optoelectronic components of the ESA. These off line measurements and adjustments are performed periodically for tight process control.

One of the difficulties associated with the alignment process described above is that it is difficult to measure alignment accurately with a conventional optics system module. The optical axis defined by the line of the optoelectronic element, the center of the lens, and the image of the optoelectronic element needs to be in perfect alignment with the optical axis of the measurement microscope. The mechanical structure used to hold the fiber needs to constrain the fiber end face at exactly the same point at which the image of the optoelectronic element is focused.

In arrangements where the fiber ends are secured directly to the optical ports, the optical ports are typically round and have slightly larger diameters than the diameters of the fibers to ensure that the fiber can be inserted into the port and later fixedly secured to the port by epoxy. In such a design, there is an uncertainty, or error, due to the fiber being able to move around in the port. Alternatively, the optical port can have a slightly smaller diameter than the diameter of the fiber. In the latter case, the ends of the optical fibers, which are also round, are pressed into the respective ports until the end faces of the optical fibers are in abutment with stops disposed inside of the respective ports. In such arrangements, the fiber is said to be press fit into the port. The interference between the fiber and the material of which the port is made holds the fiber in place.

In order for this round/round interface between the fiber ends and the respective optical ports to be effective, a relatively large force needs to be exerted on the fiber to push the fiber into the port, which can damage the fiber. Also, because of the tight fit at this interface, it is possible that an air gap will exist between the fiber end face and the stop disposed inside of the port, which can lead to the occurrence of Fresnel losses at the interface. Refractive index matching (RIM) epoxy cannot be used at this interface to prevent such Fresnel losses from occurring. Typically, there is surface roughness at the end face of the fiber, both in the case of cleaved glass fiber and in the case of cut and polished plastic fiber. If RIM epoxy could be used in such arrangements, it would help to minimize optical loss by filling in the roughness. Hence, the lack of RIM epoxy at this interface introduces an extra loss due to the imperfection of the fiber end face.

A need exists for an optical communications module that can withstand solder reflow process so that it can be mounted via an SMT process to a system PCB. A need also exists for an optics system module that is more easily aligned with the optical communications module during the process of mounting the optics system module on the optical communications module, and that can eliminate or reduce the occurrence of Fresnel losses and losses due to imperfect fiber end faces at the interfaces between the fiber end faces and the optical ports of the optics system module.

SUMMARY OF THE INVENTION

The invention is directed to an optics system module for use in an optical communications module, an optical communications module that incorporates the optics system module, and a method. The optics system module has an upper surface, a lower surface, a rear end, and a front end. At least a first optical port is formed in one of the upper surface, the lower surface, the front end, and the rear end for receiving an end of a first optical fiber. The first optical port has a non-round shape and is sized to grip a round outer surface of a first optical fiber.

The optical communications module comprises an ESA comprising a circuit board and at least a first optoelectronic component mounted on an upper surface of the circuit board, and an optics system module attached to the ESA. The optics system module has an upper surface, a lower surface, a rear end, and a front end. At least a first optical port is formed in one of the upper surface, the lower surface, the front end, and the rear end for receiving an end of a first optical fiber. The first optical port has a non-round shape and is sized to grip a round outer surface of a first optical fiber. The optics system module is configured to optically couple light between the first optical port and the first optoelectronic component.

The method comprises: providing an optical communications module comprising an ESA and an optics system module attached to the ESA, where at least a first optical port formed in the optics system module has an end of a first optical fiber secured thereto by a RIM epoxy, and where the first optical port has a non-round shape and is sized such that it grips a round outer surface of the first optical fiber; and, with the optics system module, optically coupling light between the first optical port and the first optoelectronic component.

These and other features and advantages of the invention will become apparent from the following description, drawings and claims.

DETAILED DESCRIPTION OF AN ILLUSTRATIVE EMBODIMENT

Figure 1:
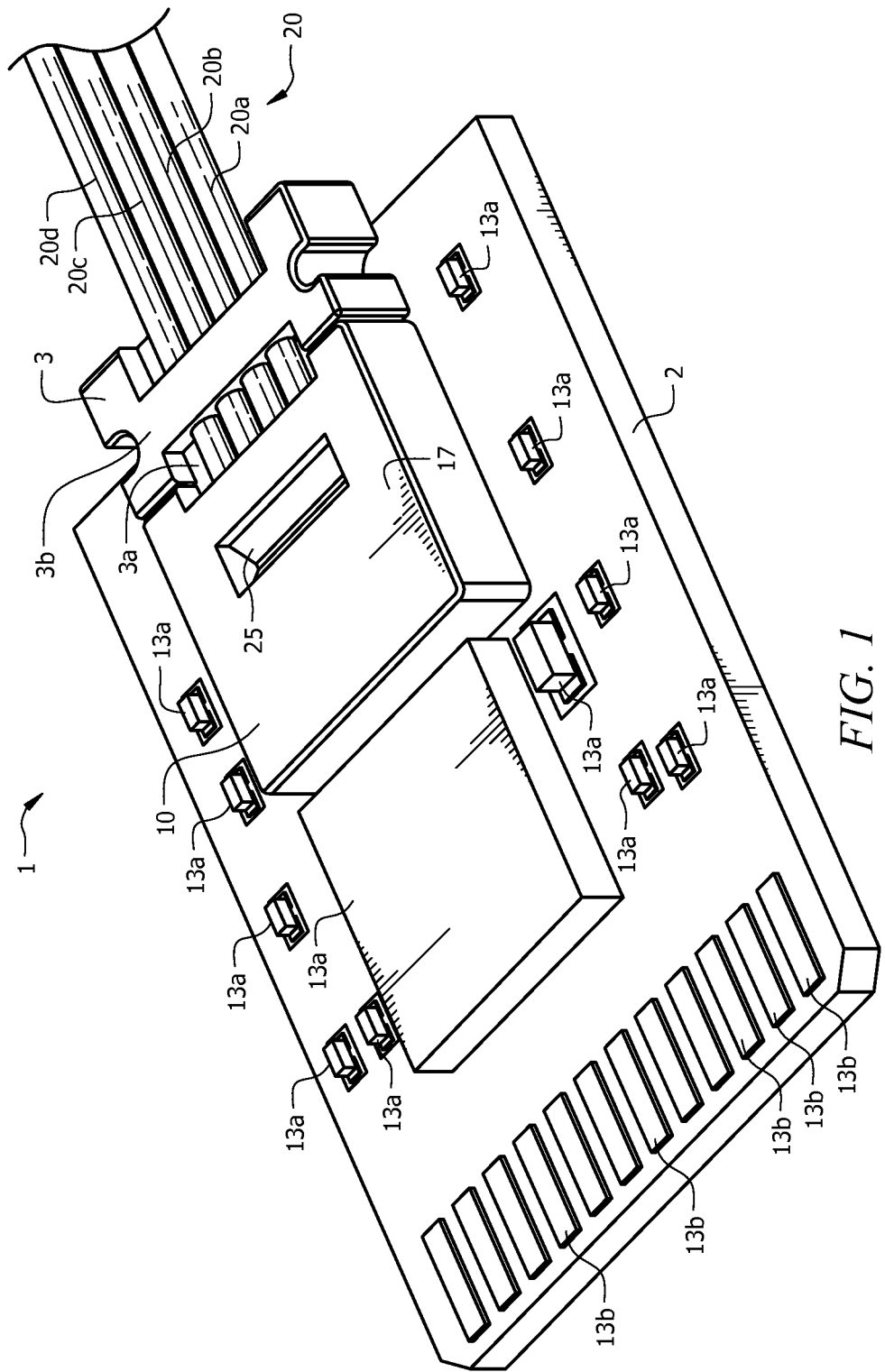
FIG. 1 illustrates a top perspective view of an optical transceiver module in accordance with an illustrative embodiment, which is shown connected to ends of a plurality of optical fibers.

In accordance with embodiments of the invention, an optics system module is provided that can be more easily aligned with the ESA during the mounting process, that reduces the possibility of the fiber ends being damaged when they are connected to the respective optical ports of the optics system module, and that reduces or eliminates the occurrence of Fresnel losses at the interface between the fiber end faces and the optical ports. The optical ports have non-round shapes that are symmetrical with respect to the transverse shapes of the fibers, i.e., the shapes of the fibers in the direction that is transverse to the optical axes of the fibers. This symmetry ensures that the center of the fiber end face is kept at the center of the optical port. In other words, this symmetry ensures that the core of the fiber is aligned with the center of the optical port. The non-round, symmetrical shape of the optical ports reduces the amount of force required to push the fiber into the ports, thus reducing the chance of damaging the fiber when pushing it into the port.

Also, the difference between the shapes of the fibers and the optical ports creates channels between the exterior surfaces of the optical fibers and the interior surfaces of the optical ports that allow a RIM epoxy to be disposed inside of the optical ports in contact with the end faces of the fibers and with the optical ports to eliminate any air gaps. Eliminating air gaps ensures that Fresnel losses will not occur at the interfaces of the end faces of the optical fibers and the optical ports. As indicated above, RIM epoxy cannot be used to prevent such Fresnel losses from occurring in the known round fiber/round port interfaces because the fiber end faces must be in abutment with the respective stops disposed inside of the respective ports in such designs to achieve precision alignment.

In addition, in accordance with an embodiment, the optics system module has a configuration that causes the image plane on which the image of the optoelectronic component is focused to be located at a predetermined location in the optical port that is easily viewable from outside of the port. This latter feature facilitates the process of aligning the optics system module with the optical communications module during the mounting process. Illustrative embodiments of the optics system module and of the optical communications module that incorporates the optics system module will now be described with reference to FIGS. 1-7, in which like reference numerals represent like elements, components or features. It should be noted that elements, components or features in the FIGS. 1-7 are not necessarily drawn to scale.

FIG. 1 illustrates a top perspective view of an optical transceiver module 1 in accordance with an illustrative embodiment, which is shown connected to ends of a plurality of optical fibers 20. In accordance with this illustrative embodiment, the optical transceiver module 1 has four channels, although the optical transceiver module 1 could have any number of channels equal to or greater than one. The optical transceiver module 1 includes an ESA 2 and an optics system module 10 mounted on the ESA 2. In accordance with this illustrative embodiment, the optical transceiver module 1 also includes a fiber organizer 3 for holding end portions of the optical fibers 20, as will be described below in more detail. The fiber organizer 3 is optional. The optics system module 10 is typically made of a molded plastic material, such as, for example, ULTEM™ polyetherimide, which is a type of polyetherimide that is manufactured by the Saudi Basic Industries Corporation (SABIC) of Riyadh, Saudi Arabia. However, other suitable materials, such as polycarbonate, for example, may be used for the optics system module 10.

Figure 2:
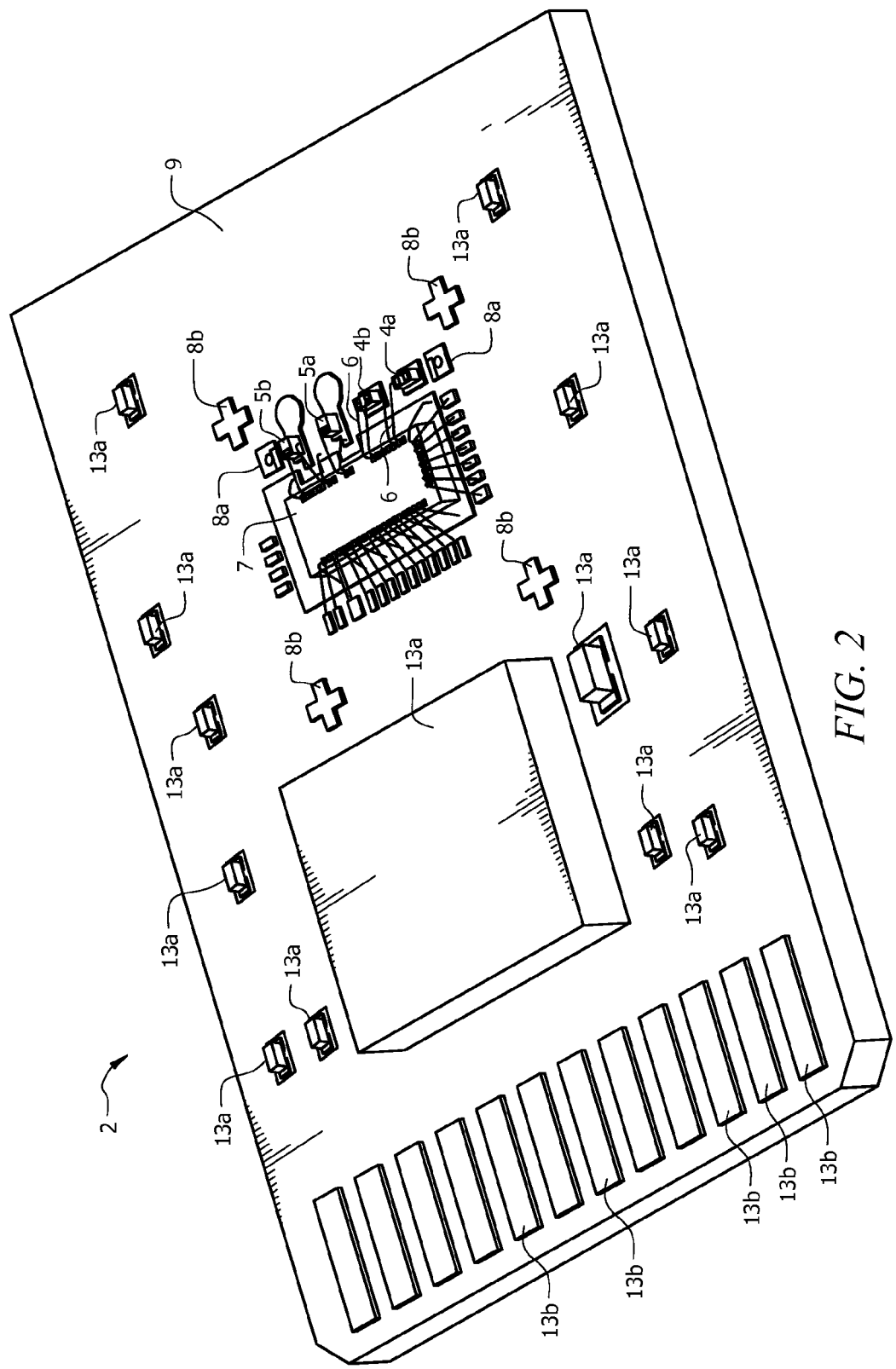
FIG. 2 illustrates a top perspective view of the ESA of the optical transceiver module shown in FIG. 1.

FIG. 2 illustrates a top perspective view of the ESA 2 of the optical transceiver module 1 shown in FIG. 1. In accordance with this illustrative embodiment, the ESA 2 provides two transmit channels and two receive channels. Each of the transmit channels includes a light source, which is typically a vertical cavity surface emitting laser diode (VCSEL). The light sources 5a and 5b generate optical signals for transmission over optical fibers 20c and 20d (FIG. 1), respectively. Each of the receive channels includes a light detector, which is typically a P-intrinsic-N (PIN) diode, for converting an optical signal into an electrical signal. The light detectors 4a and 4b convert optical signals passing out of the ends of optical fibers 20a and 20b (FIG. 1), respectively, into electrical signals. The light sources 5a, 5b and the light detectors 4a, 4b are electrically coupled via bond wires 6 to a controller IC 7 of the ESA 2.

The controller IC 7 acts as a driver IC for driving the light sources 5a, 5b and as a receiver IC for processing the electrical signals that are output from the light detectors 4a, 4b. The ESA 2 also includes fiducial marks 8a that are used for coarse alignment of the light sources 5a, 5b and light detectors 4a, 4b with the ESA 2. The ESA 2 also includes fiducial marks 8b that are used for leveling the optics system module 10 during the mounting process. The components 4-7 of the ESA 2 are die attached on a surface of a PCB 9 of the ESA 2. As will be understood by persons of skill in the art in view of the description being provided herein, the controller IC 7 may have functionality in addition to that described above, but such additional functionality will not be described herein in the interest of brevity. Additional components 13a are typically also mounted on the ESA 2, such as, for example, decoupling capacitors, resistors, and CDR circuitry. The ESA 2 may also include edge card connector electrical contact pads 13b that make electrical connections with external circuitry (not shown for clarity) when the optical transceiver module 1 is plugged into an edge card slot (not shown for purposes of clarity).

Figure 3:
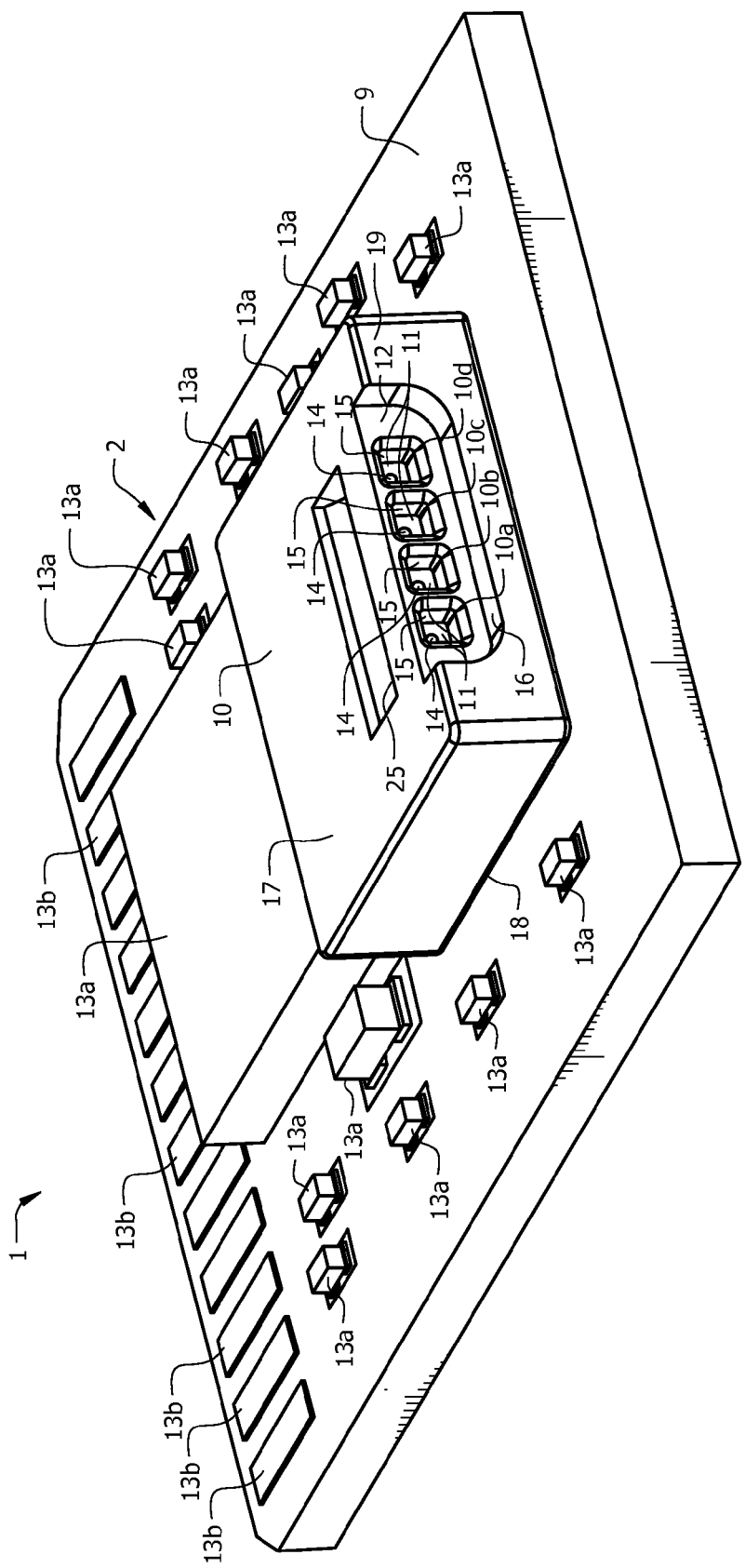
FIG. 3 illustrates a rear perspective view of the optical transceiver module shown in FIG. 1 with the optical fibers removed to show a plurality of optical ports formed in a rear portion of the optics system module.

FIG. 3 illustrates a rear perspective view of the optical transceiver module 1 shown in FIG. 1 with the optical fibers 20 and the organizer 3 removed to show a plurality of optical ports 10a-10d formed in a rear portion of the optics system module 10. For illustrative purposes, the optical ports 10a-10d are shown as being rectangular in shape, but they may have any non-round shape that is symmetrical to the transverse shape of the fibers 20a-20d (i.e., to the shape of the fiber in the direction that is transverse to the optical axes of the fibers). Within each optical port 10a-10d, a stop 11 exists that constitutes a front end of the port 10a-10d. A rear surface 12 of the optics system module 10 constitutes a rear end of each of the ports 10a-10d. Each of the ports 10a-10d has a lens-like element 14 formed in the respective stop 11. The shape and location of the lens-like element 14 is symmetric with respect to the side walls 15 of the ports 10a-10d. In the illustrative embodiment shown in FIG. 3, the ports 10a-10d are depicted as being square in shape and the lens-like elements 14 are depicted as being circular in shape and centered on the stops 11.

The lens-like elements 14 are generally co-planar with the stops 11 and with respective images of the respective optoelectronic components 4a-5b (FIG. 2) that are focused onto the respective apexes of the respective lens-like elements 14, as will be described below in more detail with reference to FIG. 5. This aspect facilitates the process of optically aligning the optics system module 10 with the ESA 2 in order to optically align the respective optoelectronic components 4a-5b with the respective optical ports 10a-10d, as will be described below in more detail.

The ports 10a-10d each have a length, L, corresponding to the shortest distance between respective the stop 11 and a plane in which the rear surface 12 resides. This length, L, is designed to be relatively short in order to allow a microscope (not shown) or other visual system with a relatively wide field of view (FOV) to observe the lens-like elements 14 from outside of the ports 10. As indicated above, the images of the optoelectronic components 4a-5b are focused on respective apexes of the respective lens-like elements 14. This aspect in combination with the wide FOVs makes it easier to view the images of the optoelectronic components 4a-5b with a microscope of other viewing system to determine the alignment accuracy of the ports 10a-10d with the optoelectronic components 4a-5b. This, in turn, makes it easier to control the alignment process during manufacturing.

In accordance with this illustrative embodiment, the rear surface 12 (FIG. 3) is recessed from the rear end 19 of the optics system module 10 to form a lip 16 that engages a complementarily-shaped tray 3a (FIG. 1) of the organizer 3. This feature allows the organizer 3 and the optics system module 10 to precisely engage one another. The ends of the fibers 20a-20d are inserted through an opening in the organizer defined by a lower surface of a cross-beam 3b (FIG. 1) and the tray 3a (FIG. 1). The ends of the fibers 20a-20d are then inserted into the respective optical ports 10a-10d such that the respective end faces of the fibers 20a-20d are in abutment with, or in near abutment with, the respective apexes of the respective lens-like elements 14. The organizer 3 is then slid into engagement with the optics system module 10.

Typically, RIM epoxy (not shown) will be placed on the tips of the respective fibers or on the lens-like elements 14 before the ends of the fibers 20a-20d are connected to the respective ports 10a-10d. Insertion of the ends of the fibers 20a-20d into the respective ports 10a-10d pushes the epoxy forward to fill any air gaps that might otherwise exist between the end faces of the optical fibers 20a-20d and the respective stops 11. Any excess epoxy will leak out through the aforementioned channels that exist between the outer surfaces of the fibers 20a-20d and the interior surfaces 15 of the ports 10a-10d. After the organizer 3 is slid into position, more epoxy will be poured onto the portions of the fibers 20a-20d that are disposed on top of the tray 3a of the organizer 3. When the epoxy cures, it fixedly secures the ends of the fibers 20a-20d to the respective ports 10a-10d and fixedly secures the organizer 3 to the optics system module 10 in the position shown in FIG. 1. The organizer 3 provides strain relief to the fibers 20a-20d and helps to hold their end faces in their connected positions.

An angled facet 25 (FIG. 1) is formed in an upper surface 17 of the optics system module 10. The angled facet 25 is a reflector that folds the optical pathways. Lenses (not shown) of the optics system module 10 are also formed in a lower surface 18 of the optics system module 10. As will be described below in more detail, the angled facet 25 and the lenses formed in the lower surface 18 of the optics system module 10 cooperate to couple light between the optoelectronic components 4a-5b and the ends of the optical fibers 20a-20d, respectively.

Figure 4:
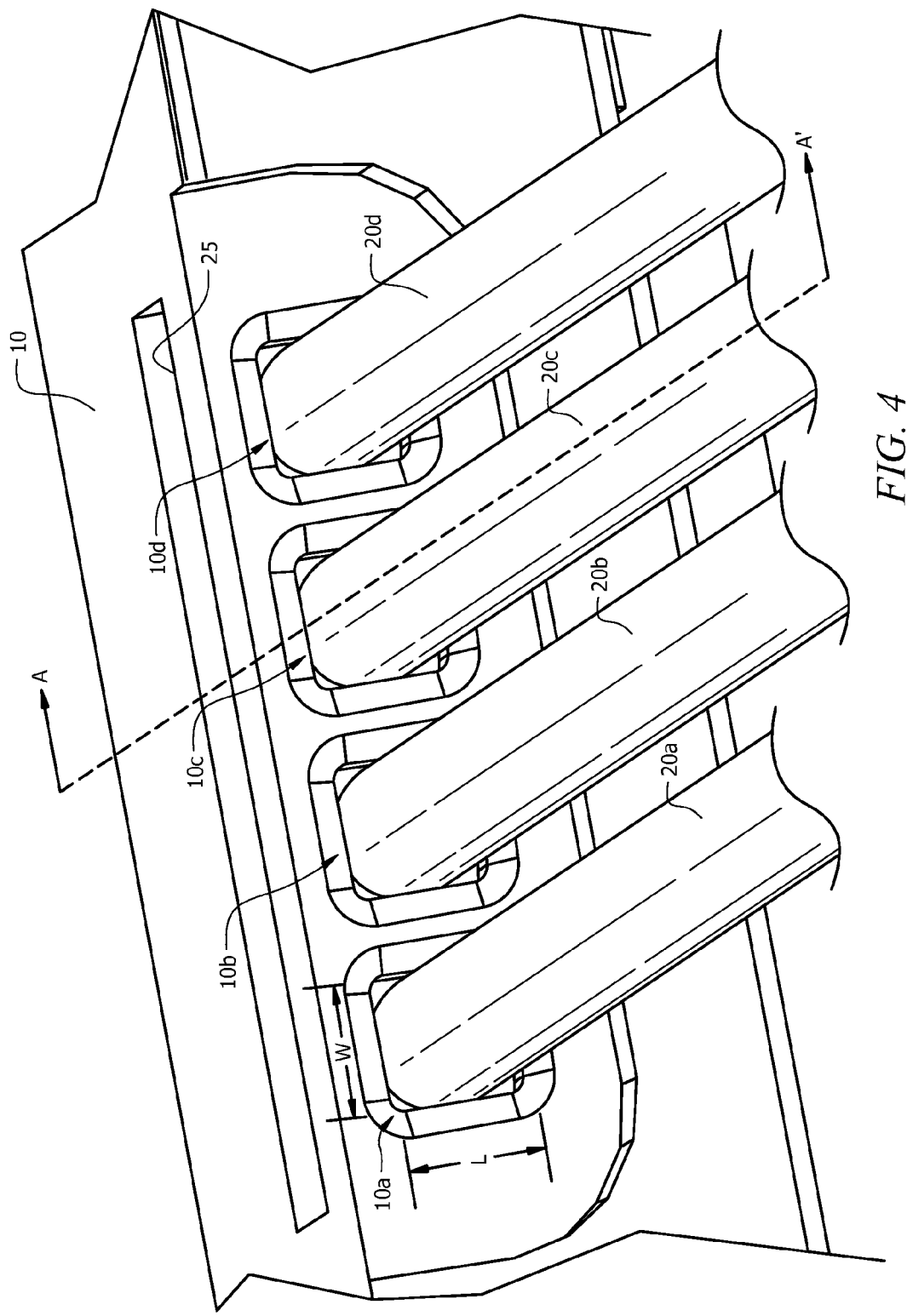
FIG. 4 illustrates a rear perspective view of the optical transceiver module shown in FIG. 3 with the optical fibers connected thereto to show the manner in which the optical ports grip the respective optical fibers.

FIG. 4 illustrates a rear perspective view of the optical transceiver module 1 shown in FIG. 3 with the optical fibers 20 connected thereto to show the manner in which the optical ports 10a-10d grip the respective optical fibers 20a-20d. The width, W, and/or the length, L, of the ports 10a-10d are slightly smaller than the diameter of the fibers 20a-20d to ensure that the ports 10a-10d exert symmetrical forces on the respective fibers 20a-20d that cause the ports 10a-10d to grip the fibers 20a-20d. Typically, both the width W and the length L of the ports will be slightly smaller than the diameter of the fibers to ensure that the ports grip the fibers at several locations around the outer peripheries of the fibers. Because the optical ports 10a-10d are non-round in shape (e.g., rectangular), less force is required to push the optical fiber 20a-20d into the respective ports 10a-10d. Although there is less interference between the ports and the optical fibers 20a-20d than in the known round/round interface described above, the amount of interference that exists between the optical fibers 20a-20d and the respective ports 10a-10d is sufficient to ensure that the ports 10a-10d grip the fibers 20a-20d to help hold them in their connected positions.

Furthermore, as indicated above, a RIM epoxy (not shown) is disposed inside of the ports 10a-10d for fixedly securing the fibers 20a-20d in their connected positions inside of the respective ports 10a-10d. Because the shape of the ports 10a-10d is different from the shape of the fibers 20a-20d, some space exists between the outer surfaces of the fibers 20a-20d and the inner surfaces of the ports 10 through which the RIM epoxy can seep. When the RIM epoxy hardens, it forms a bond that helps secure the fibers 20a-20d to the respective ports 10a-10d. The RIM epoxy is transparent to the operating wavelength of the optical signals that are used by the optical transceiver module 1.

The RIM epoxy serves the additional purpose of filling in any air gaps that might exist in between the end faces of the optical fibers 20a-20d and the respective stops 11 (FIG. 3) of the ports 10a-10d. Filling in these air gaps eliminates any refractive index change at the interface between the end faces of the optical fibers 20a-20d and the stops 11 (FIG. 3) that might otherwise exist. Eliminating these air gaps prevents Fresnel reflections from occurring at these interfaces. Preventing Fresnel reflections from occurring at these interfaces prevents optical losses from occurring at the interfaces, which is important in helping the transceiver module 1 to achieve good optical performance. Additionally, the epoxy can fill in any roughness or imperfection due to the preparation of the optical fiber tip. Such imperfections can be formed during cleaving or polishing operations.

Figure 5:
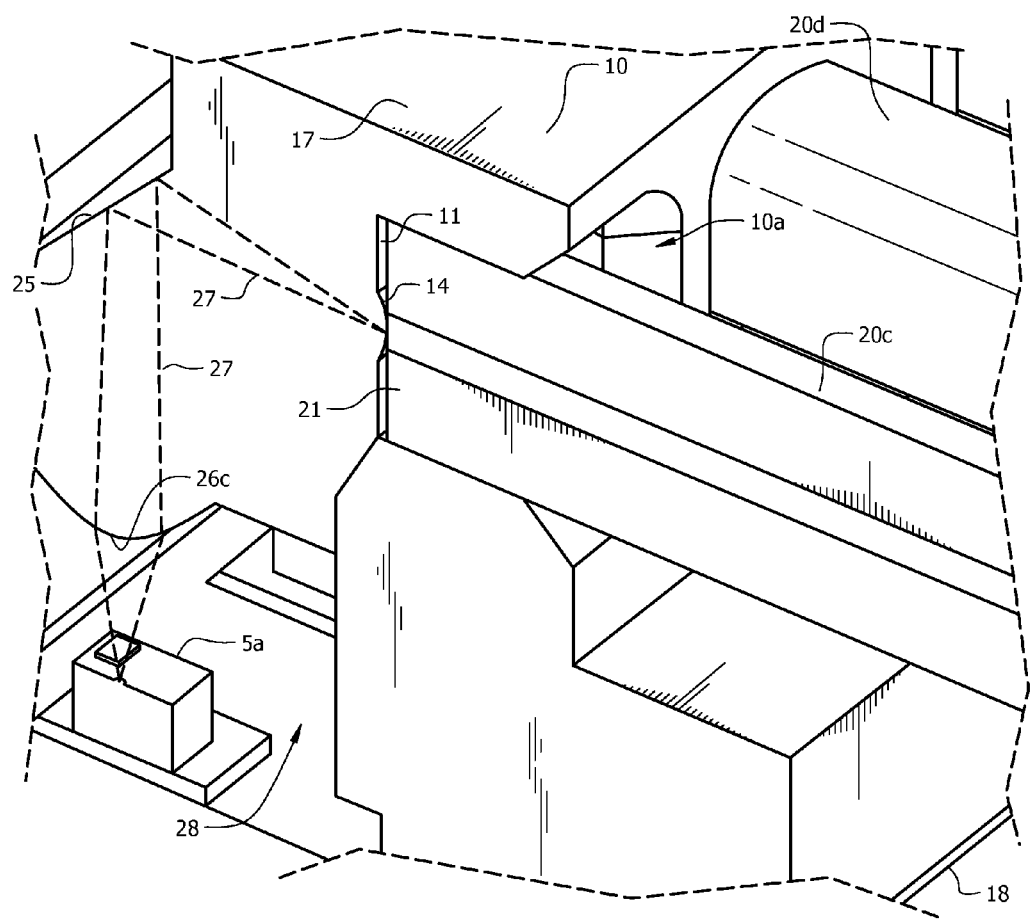
FIG. 5 illustrates a perspective cross-sectional side view of a portion of the optical transceiver module shown in FIG. 4 taken along line A-A' of FIG. 4.

FIG. 5 illustrates a perspective cross-sectional side view of a portion of the optical transceiver module 1 shown in FIG. 4 taken along line A-A' of FIG. 4. As can be seen in FIG. 5, when the fibers 20a-20d are connected to the respective ports 10a-10d, the centers of the end faces of the fibers 20a-20d are in abutment with the centers, or apexes, of the lens-like elements 14 of the stops 11. As indicated above, a thin film of the RIM epoxy (not shown) is disposed in between the end faces of the fibers 20a-20d and the stops 11 to prevent there from being any change in refractive index at the interfaces between the end faces of the optical fibers 20a-20d and the stops 11.

The optics system module 10 has an angled facet 25 formed in an upper surface 17 of the optics system module 10 that functions as a total internal reflection (TIR) surface. In accordance with this illustrative embodiment, the TIR surface 25 is angled at 45° such that it reflects incident light to an angle of 90°, although the TIR surface 25 could be designed to reflect light at other angles. It can be seen that the lower surfaces of the optics system module 10 form a cavity 28 in the optics system module 10 that provides space for the components 4-7 of the ESA 2 (FIG. 2) such that the components 4-7 are disposed in between the walls of the cavity 28 and the upper surface of the PCB 9 of the ESA 2.

In accordance with this illustrative embodiment in which there are four optical pathways formed in the optics system module 10, there are four focusing lenses 26a-26d formed on a lower surface 18 of the optics system module 10, although only lens 26c is visible in FIG. 5. The dashed lines 27 shown in FIG. 5 represent the optical signal produced by the light source 5a and demonstrate the manner in which the optics system module 10 operates on an optical signal output from light source 5a. The optics system module 10 operates on the optical signal 27 in such a way that the optics system module 10 focuses an image of the light source 5a at the apex of the lens-like element 14. When the optical signal 27 is output from the light source 5a, it begins to diverge and continues to diverge until it is incident on lens 26c. Lens 26c, in accordance with this embodiment, is a refractive lens that causes the light beam to begin converging. The light beam continues to converge after reflection on TIR surface 25, until it reaches the apex of lens-like feature 14. The lens 26c inverts the image of the light source 4a and projects it onto the lens-like element 14.

The characteristics of the TIR surface 25 and lenses 26a-26d and their positions relative to each other and relative to the positions of the optoelectronic components 4a-5b are chosen to ensure that the image of the optoelectronic components 4a-5b are focused on the apexes of the respective lens-like elements 14. This is accomplished by designing the optics system module 10 and the ESA 2 in accordance with the well known lens equation: 1/u+1/v=1/f, where u=distance from the respective optoelectronic component 4a-5b to the respective lenses 26a-26d, v=distance from the lenses 26a-26d to the respective image planes (the apexes of the lens-like features 14) divided by the refractive index of the lens material, and f=focal length of the lenses 26a-26d, which is related to their curvature. The TIR surface 25 is not taken into account in the lens equation because it folds the optical pathway, but otherwise does not perform any optical operations on the light.

Because the lens-like elements 14 and the focused images of the optoelectronic components 4a-5b are in the same plane, when alignment is checked with a microscope, error due to the optical axis of the microscope not being aligned with the optical axis of the optoelectronic component 4a-5b is eliminated. In addition, due to the relatively short length L of the optical ports 10a-10d, the microscope can have a relatively wide FOV for viewing the image of the optoelectronic component 4a-5b and the lens-like elements 14. The combination of these features makes the process of measuring the alignment accuracy of the optics system module 10 with the optoelectronic components much easier to perform and enables it to be performed with greater accuracy. A pick and place system is typically used for aligning the optics system module 10 with the ESA 2. Such systems typically are fast, have high precision, and can perform this function with repeatability. Occasionally, however, components are taken off line and alignment is measured with a microscope. This measurement needs to be accurate. Once this measurement has been performed, the vision system of the pick and place system is adjusted, if necessary, according to the measurement obtained by the microscope. The lens-like element 14, and the image of the optoelectronic component at the apex of the lens-like element 14, enable the microscope measurement to be performed accurately and easily. The accuracy and ease with which this measurement can be performed allows a greater number of such measurement operations to be performed, which leads to tighter and more accurate control of the assembly process. Of course, vision systems other than a microscope may be used to perform the offline optical measurement process.

It can be seen from the foregoing description that the optics system module 10 has several advantages over existing optics systems such as, for example, better facilitating the optical alignment/mounting process, further reducing the likelihood of optical losses, and further reducing the likelihood of the ends of the optical fibers 20 will be damaged by the forces required to push them into the ports. The optics system may be configured in a variety of ways to achieve one or more of these goals, as will be understood by those of skill in the art in view of the description being provided herein. The optics system module 10 is one example of an optics system that is configured to achieve all of these goals when used with the ESA 2.

The ESA 2 has a particular configuration and particular components, but ESAs having other configurations and other components may also be used with the optics system, as will be understood by those of skill in the art in view of the description being provided herein. Also, while the optical transceiver module 1 has been shown and described as having both transmit and receive functionality, it may instead have either transmit or receive functionality, but not both. The term "optical communications module," as that term is used herein, is intended to denote all of these different types of modules, i.e., an optical transceiver module, an optical transmitter module and an optical receiver module.

Figure 6:
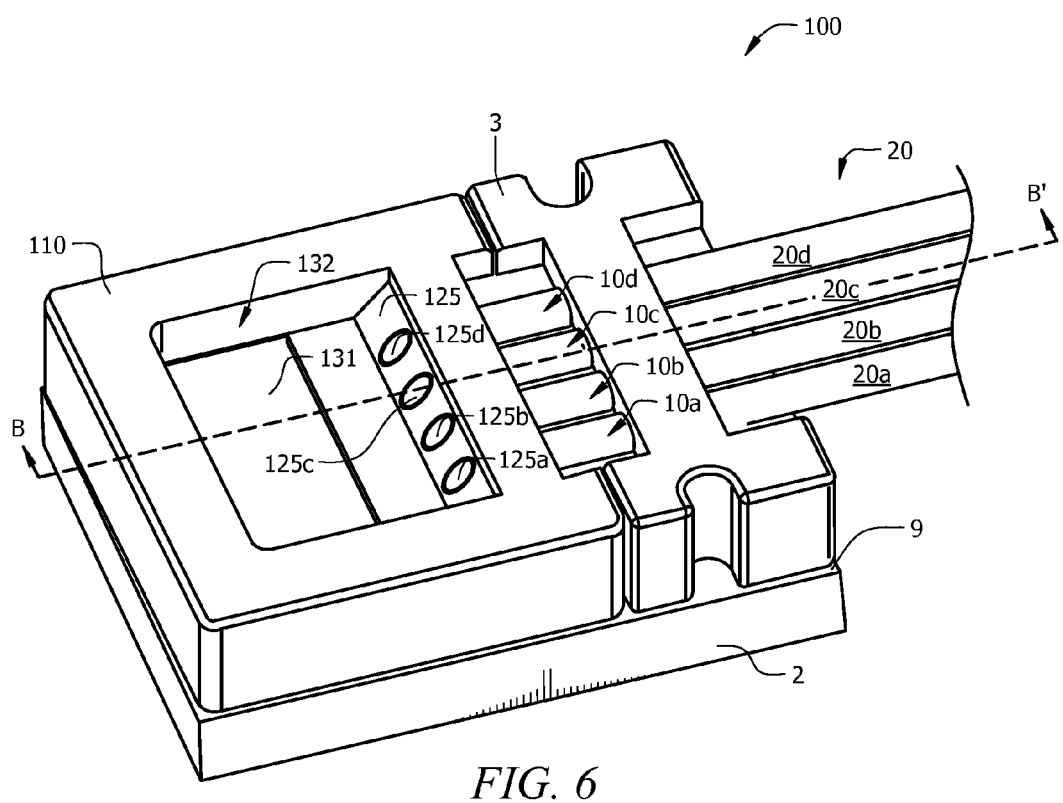
FIG. 6 illustrates a top perspective view of the optical transceiver module in accordance with another illustrative embodiment, which is shown connected to ends of a plurality of optical fibers.

FIG. 6 illustrates a top perspective view of an optical communications module 100 in accordance with another illustrative embodiment, shown connected to the ends of a plurality of optical fibers 20a-20d. In accordance with this illustrative embodiment, the optical communications module 100 is an optical transceiver module having four channels, although the module 100 could have any number of channels equal to or greater than one. The optical transceiver module 100 includes an ESA 2 and an optics system module 110 mounted on the ESA 2. In accordance with this illustrative embodiment, the optical transceiver module 100 also includes a fiber organizer 3 for holding end portions of the optical fibers 20a-20d. The fiber organizer 3 engages the optics system module 110 in the same manner in which the fiber organizer 3 engages the optics system module 10 shown in FIG. 1. Like the fiber organizer 3 shown in FIG. 1, the fiber organizer 3 shown in FIG. 6 is optional.

Figure 7:
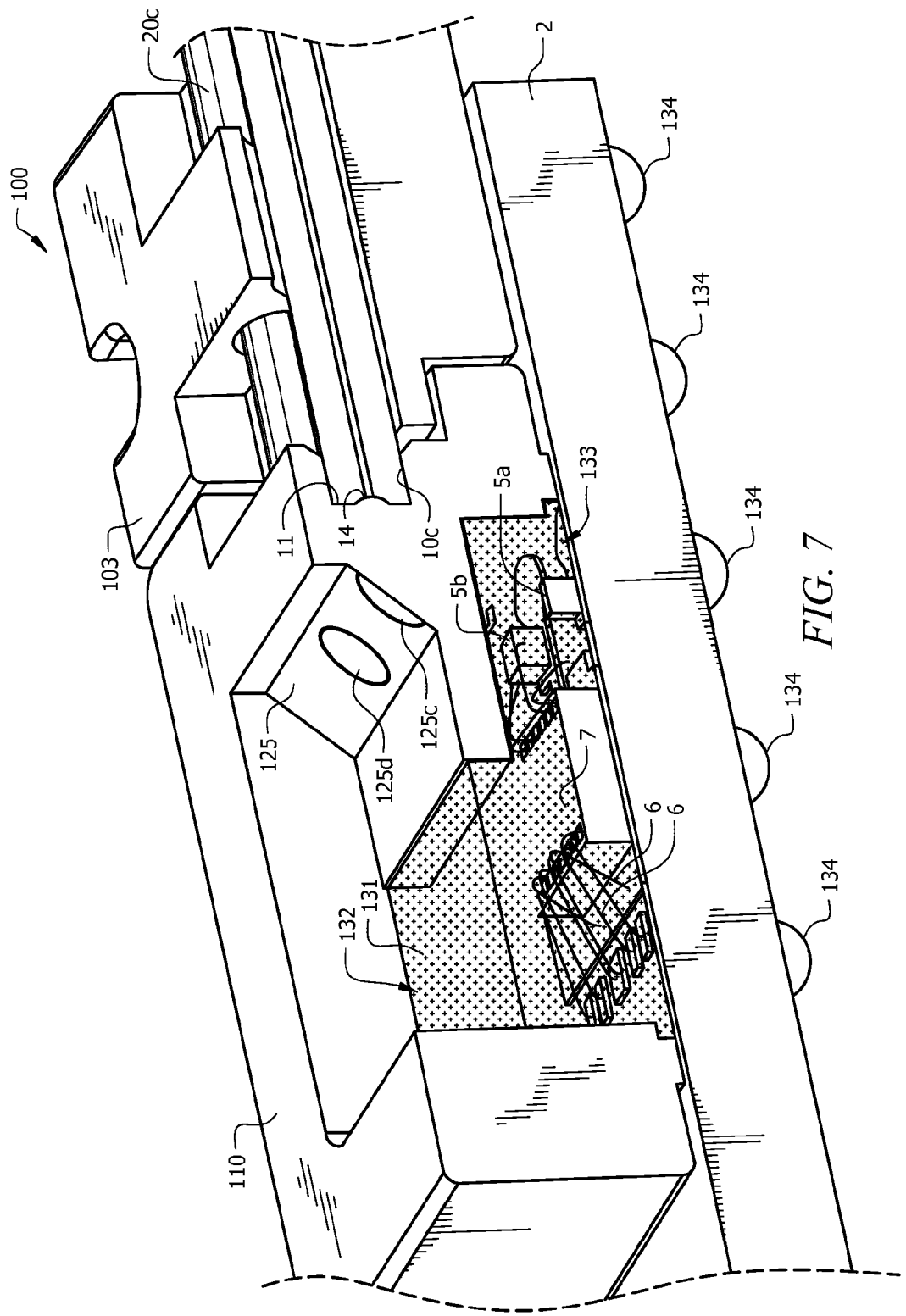
FIG. 7 illustrates a perspective cross-sectional side view of the optical transceiver module shown in FIG. 6 taken along line B-B' of FIG. 6.

FIG. 7 illustrates a perspective cross-sectional side view of the optical transceiver module 100 shown in FIG. 6 taken along line B-B' of FIG. 6. In accordance with this illustrative embodiment, the optics system module 110 is made of a material that remains dimensionally stable at high temperatures at which solder reflow processes are performed. Such temperatures typically are equal to or greater than about 230° Celsius (C). An example of a material that is suitable for this purpose is EXTEM™ polyetherimide produced by SABIC, although any material that is capable of maintaining its structural integrity, or dimensional stability, at such temperatures may be used for this purpose, provided it also has the necessary or desired optical properties. As described above with reference to the known process of assembling the known optical transceiver module, separate alignment and mounting processes are typically used to mount the components of the ESA on the PCB and to mount the optics system on the module.

After the components 4-7 and any other ESA components (not shown) have been mounted on the PCB 9, the optics system module 110 is aligned and mounted on the PCB 9. After this alignment and mounting process has been performed, RIM epoxy 131 is dispensed through an opening 132 formed in the optics system module 110 and covers the components of the ESA 2 that are disposed within the cavity 133 formed by the upper surface of the PCB 9 and by various walls and surfaces of the optics system module 110, as shown in FIG. 7. The RIM epoxy 131 is then cured to cause it to harden. The cured RIM epoxy 131 protects the components 4-7 of the ESA 2 from any solder flux or other debris that may be generated during the subsequent solder reflow process.

After the RIM epoxy 131 has been cured, the optical transceiver module 100 may be used as a SMT component by a SMT process to mount the module 100 on a higher-level system PCB, which is not shown for purposes of clarity. The module PCB 9 typically has an array of solder balls 134 disposed on its lower surface for electrically interfacing the module PCB 9 with an array of electrical contacts (not shown) disposed on an upper surface of the higher-level system PCB (not shown). An SMT process is typically used to mount other components on the higher-level system PCB and then a solder reflow process is performed to make all necessary electrical solder connections. Because the optics system module 110 is capable of withstanding solder reflow temperatures, the same SMT process that is used to mount SMT components on the higher-level system PCB may be used to mount to optical transceiver module 100 on the higher-level system PCB. A cleaning process may then be performed to wash away any solder flux from the higher-level system PCB and the components mounted thereon. The cured RIM epoxy 131 protects the ESA 2 and the components that are mounted thereon during the solder reflow and cleaning process.

The cured RIM epoxy 131 seals the portion of the ESA 2 that it covers from external elements. In this way, the cured epoxy 131 prevents solder flux from interfering with the bond wires 6 and other electrical connections of the ESA 2, which, in turn, prevents electrical problems (e.g., short circuits) from occurring in the optical transceiver module 100. The seal provided by the cured RIM epoxy 131 also prevents solder flux from interfering with the optical pathways of the optical transceiver module 100, which prevents optical problems (e.g., reflections that lead to optical losses) from occurring in the optical transceiver module 100.

The optics system module 110 (FIGS. 6 and 7) is similar in many respects to the optics system module 10 (FIGS. 1 and 3-5). Like the optics system module 10, the optics system module 110 has ports 10a-10d for receiving the ends of the optical fibers 20a-20d and an angled facet 125. The angled facet 125 comprises TIR lenses 125a-125d for focusing and folding the optical pathways by an angle of 90°. In accordance with this illustrative embodiment, there are four TIR lenses 125a-125d. Unlike the optics system module 10, the optics system module 110 does not have lenses 26a-26d (FIG. 5) formed on a lower surface thereof. In the optics system module 110, because the RIM epoxy 131 fills the cavity 133 (FIG. 7), there is no change in the refractive index at any location along the optical pathways that extend from the optoelectronic components 4a-5b through the optics system module 110 to the ports 10a-10d, which obviates the need for the refractive lenses 26a-26d (FIG. 5). Because the RIM epoxy is also disposed on the end faces of the fibers 20a-20d, there is no change in refractive index at any location along the optical pathways from the optoelectronic components 4a-5b to the end faces of the respective optical fibers 20a-20d. This feature eliminates Fresnel losses and any losses caused by imperfections in the fiber end faces from occurring at any of these interfaces.

In the transmit direction, light emitted by the VCSEL 5a (FIG. 7) travels upwards through the RIM epoxy 131 and is incident on the respective TIR lens 125c, which folds the optical pathway by 90° and focuses the image of the VCSEL 5a onto the respective image plane that is at the apex of the lens-like element 14 of the respective optical port 10c. All of the transmit channels operate in this manner. In the receive direction, light passing out of the end face of the optical fiber 20b is incident on the TIR lens 125b, which folds the optical pathway by 90° and focuses the optical signal onto the respective PIN diode 4b. All of the receive channels operate in this manner.

The optics system module 110 provides the same advantages that are provided by the optics system module 10 described above of facilitating optical alignment of the optics system module 110 with the ESA 2, preventing the ends of the fibers 20a-20d from being damaged by excessive force exerted on the fibers 20a-20d by the respective ports 10a-10d, and eliminating the occurrence of Fresnel reflections at the interfaces between the end faces of the fibers 20 and the optics system module 110. Unlike the optical transceiver module 1 described above with reference to FIGS. 1-5, the optical transceiver module 100 shown in FIGS. 6 and 7 provides the aforementioned additional advantages of ease of assembly and avoidance of problems associated with solder flux.

It should be noted that the invention has been described with reference to illustrative embodiments for the purposes of demonstrating the principles and concepts of the invention. Many modifications may be made to the illustrative embodiments described herein without deviating from the scope of the invention. For example, although the optics systems have been shown as having particular shapes or configurations, the optics systems are not limited to these shapes or configurations, as will be understood by persons of skill in the art in view of the description being provided herein. The optic system also is not limited to being used in any particular type of optical communications module. Persons skilled in the art will understand, in view of the description provided herein, that these and other modifications are within the scope of the invention.

What is claimed is:

1. An optics system module for use in an optical communications module, the optics system module comprising:
   an upper surface, a lower surface, a rear end, and a front end, wherein one of the upper surface, the lower surface, the front end, or the rear end of the optics system module has at least a first optical port formed therein for receiving an end of a first optical fiber, the first optical port having a rectangular shape defined by side walls that are contiguous and by a stop that defines a front end of the first optical port, the stop residing in a plane that is transverse to an optical axis of the first optical port and to the side walls of the first optical port, the stop having a lens-like element formed therein and extending into the optical port at a location that is symmetric with respect to the side walls of the first optical port,
   wherein when the first optical fiber is arranged in the first optical port an end face of the first optical fiber abuts an apex of the lens-like element, and
   wherein the lens-like element is between the first optical port and an opposed region of the optics system module, the opposed region including opposed openings that define a passage through the optics system module.

2. The optics system module of claim 1, wherein the optics system module is made of a molded plastic material.

3. The optics system module of claim 2, wherein the molded plastic material is a thermoplastic polyetherimide.

4. The optics system module of claim 1, wherein said at least a first optical port is formed in the rear end of the optics system module.

5. The optics system module of claim 4, wherein the rear end of the optics system module has at least a second optical port formed therein for receiving an end of a second optical fiber, the second optical port having a non-round shape and being sized to grip a round outer surface of a second optical fiber.

6. The optics system module of claim 1, further comprising:
   at least a first refractive optical element disposed on a surface in the passage; and
   at least a first total internal reflection (TIR) optical element disposed in the optics system module along a first optical pathway, wherein a first portion of the first optical pathway extends from the first refractive optical element to the first TIR optical element, and wherein a second portion of the first optical pathway extends from the first TIR optical element to the first optical port, and wherein the first TIR optical element folds the first optical pathway such that the first portion is at a non-zero angle to the second portion.

7. The optics system module of claim 6, wherein the first TIR optical element folds the optical pathway by an angle of 90°.

8. An optical communications module comprising:
an electrical subassembly (ESA) comprising a circuit board and at least a first optoelectronic component mounted on an upper surface of the circuit board; and
an optics system module attached to the ESA, the optics system module having an upper surface, a lower surface, a rear end, and a front end, the optics system module having a first opening in a cavity that surrounds at least the first optoelectronic component and a second opening opposed to the first opening, wherein one of the upper surface, the lower surface, the front end, or the rear end of the optics system module has at least a first optical port formed therein for receiving an end of a first optical fiber, the first optical port having a rectangular shape defined by side walls that are contiguous and by a stop that defines a front end of the first optical port, the stop residing in a plane that is transverse to an optical axis of the first optical port and to the side walls of the first optical port, the stop having a lens-like element formed therein and extending into the first optical port at a location that is symmetric with respect to the side walls of the first optical port, the lens-like element arranged between the first optical port and an opposed region of the optics system module, the opposed region including opposed openings that define a passage through the optics system module,
wherein when the first optical fiber is arranged in the first optical port an end face of the first optical fiber abuts an apex of the lens-like element such that the optics system module optically couples light between the first optical port and the first optoelectronic component.

9. The optical communications module of claim 8, wherein said at least a first optical port is formed in the rear end of the optics system module.

10. The optical communications module of claim 9, wherein said at least a first optoelectronic component is disposed on the upper surface of the printed circuit board within the passage.

11. The optical communications module of claim 9, further comprising:
at least a first refractive optical element disposed on a surface of the passage, the first refractive optical element having an optical axis that is aligned with an optical axis of the first optoelectronic component; and
at least a first total internal reflection (TIR) optical element disposed in the optics system module along a first optical pathway, wherein a first portion of the first optical pathway extends from the first optoelectronic component through the first refractive optical element to the first TIR optical element, and wherein a second portion of the first optical pathway extends from the first TIR optical element to the first optical port, and wherein the first TIR optical element folds the first optical pathway such that the first portion is at a non-zero angle to the second portion.

12. The optical communications module of claim 11, wherein the first TIR optical element folds the optical pathway by an angle of 90°.

13. The optical communications module of claim 11, wherein the first TIR optical element has a curvature that provides a focusing effect on incident light.

14. The optical communications module of claim 11, wherein the first optoelectronic component, the first refractive optical element and the first TIR optical element are positioned and oriented such that an image of the first optoelectronic component is focused at an apex of the lens-like element.

15. The optical communications module of claim 14, wherein the lens-like element has a circular shape.

16. The optical communications module of claim 14, wherein the lens-like element has a non-circular shape.

17. The optical communications module of claim 14, wherein the optics system module is made of a molded plastic material.

18. The optical communications module of claim 17, wherein the molded plastic material is a thermoplastic polyetherimide.

19. The optical communications module of claim 8, further comprising:
a refractive index matching (RIM) epoxy disposed in the passage and being in contact with at least a first surface of the first optoelectronic component and with a surface of the passage; and
at least a first total internal reflection (TIR) optical element disposed in the optics system module along a first portion of a first optical pathway that extends from the first surface of the first optoelectronic component to the first TIR optical element, the RIM epoxy encompassing the first portion of the first optical pathway, wherein a second portion of the first optical pathway extends from the first TIR optical element to the first optical port, and wherein the first TIR optical element folds the first optical pathway such that the first portion is at a non-zero angle to the second portion.

20. The optical communications module of claim 19, wherein the first TIR optical element folds the optical pathway by an angle of 90°.

21. The optical communications module of claim 20, wherein the first TIR optical element has a curvature that provides a focusing effect on incident light.

22. The optical communications module of claim 19, wherein the first optoelectronic component and the first TIR optical element are positioned and oriented such that an image of the first optoelectronic component is focused at an apex of the lens-like element.

23. The optical communications module of claim 19, wherein the optics system module is made of a molded plastic material.

24. The optical communications module of claim 23, wherein the molded plastic material is a thermoplastic polyetherimide.

25. The optical communications module of claim 24, wherein the thermoplastic polyetherimide has a structural integrity that is maintained at temperatures equal to or greater than 230° Celsius.

26. A method for optically coupling light in an optical communications module, the method comprising:
providing an optical communications module comprising an electrical subassembly (ESA) and an optics system module attached to the ESA, the ESA comprising a circuit board and at least a first optoelectronic component mounted on an upper surface of the circuit board, the optics system module having an upper surface, a lower surface, a rear end, and a front end, wherein one of the upper surface, a lower surface, a rear end, and a front end of the optics system module has at least a first optical port formed therein having an end of a first optical fiber secured thereto by a refractive index matching (RIM) epoxy, the first optical port having a rectangular shape defined by side walls that are contiguous and by a stop that defines a front end of the first optical port, the stop residing in a plane that is transverse to an optical axis of the first optical port and to the side walls of the first optical port, the stop having a lens-like element integrally formed in the optics system module and extending into the optical port at a location that is symmetric with respect to the side walls of the first optical port, wherein the optics system module defines a passage located proximal to a front end of the optics system module and transverse to a longitudinal axis of the first optical port located on an opposed side of the lens-like element and such that the passage surrounds at least the first optoelectronic component on the upper surface of the circuit board, the passage having a first opening along the lower surface of the optics system module and an opposed opening along the upper surface of the optics system module;

inserting the first optical fiber until it abuts an apex of the lens-like element; and with the optics system module, optically coupling light between the first optical port and the first optoelectronic component.

27. The method of claim 26, wherein said at least a first optical port is formed in the rear end of the optics system module.

28. The method of claim 26, wherein the optics system module further comprises:

at least a first refractive optical element having an optical axis that is aligned with an optical axis of the first optoelectronic component; and at least a first total internal reflection (TIR) optical element disposed in the optics system module along a first optical pathway, wherein a first portion of the first optical pathway extends from the first optoelectronic component through the first refractive optical element to the first TIR optical element, and wherein a second portion of the first optical pathway extends from the first TIR optical element to the first optical port, and wherein the first TIR optical element folds the first optical pathway such that the first portion is at a non-zero angle to the second portion.

29. The method of claim 28, wherein the first TIR optical element folds the optical pathway by an angle of 90°.

30. The method of claim 29, wherein the first optoelectronic component, the first refractive optical element and the first TIR optical element are positioned and oriented such that an image of the first optoelectronic component is focused at an apex of the lens-like element.

31. The method of claim 28, wherein a refractive index matching (RIM) epoxy is disposed in the passage and is in contact with at least a first surface of the first optoelectronic component, and wherein at least a first total internal reflection (TIR) optical element is disposed in the optics system module along a first portion of a first optical pathway that extends from the first surface of the first optoelectronic component to the first TIR optical element, the RIM epoxy encompassing the first portion of the first optical pathway, wherein a second portion of the first optical pathway extends from the first TIR optical element to the first optical port, and wherein the first TIR optical element folds the first optical pathway such that the first portion is at a non-zero angle to the second portion.

32. The method of claim 31, wherein the first TIR optical element has a curvature that provides a focusing effect on incident light.

33. The method of claim 31, wherein the optics system module comprises a thermoplastic polyetherimide having a structural integrity that is maintained at temperatures equal to or greater than 230° Celsius.

* * * * *